May 16, 1933.  J. E. MARSDEN  1,909,778
METHOD OF PRODUCING RECEPTACLES FROM MOLTEN MATERIAL
Filed May 7, 1929  2 Sheets-Sheet 2
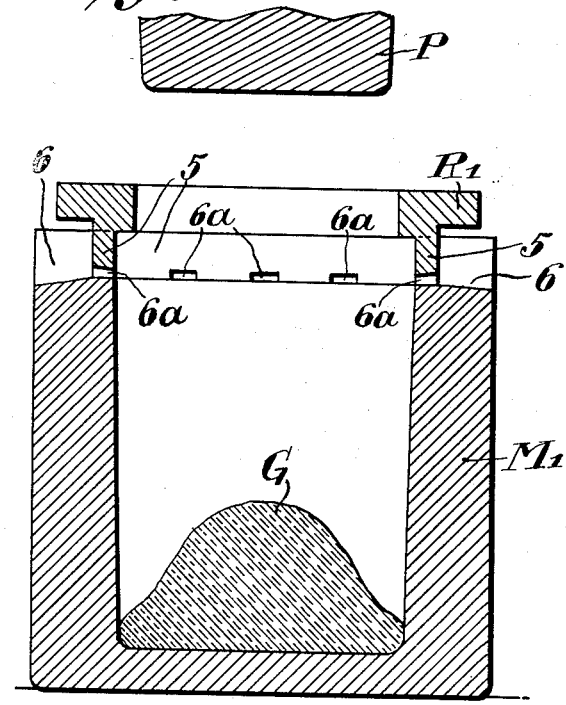
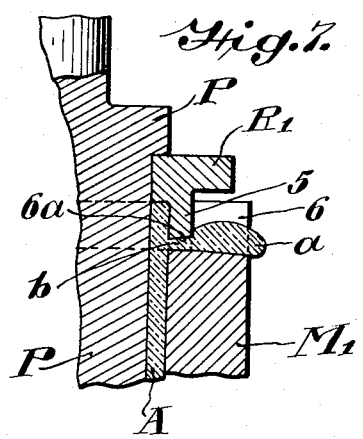
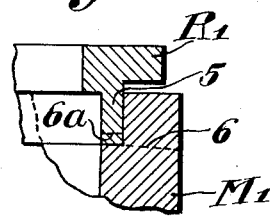
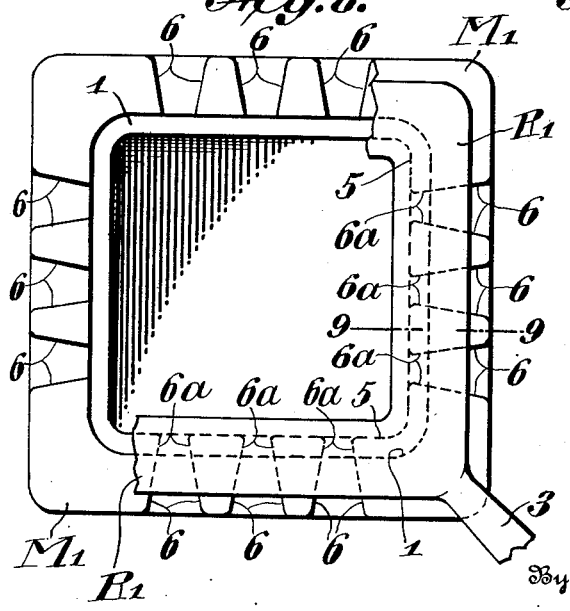
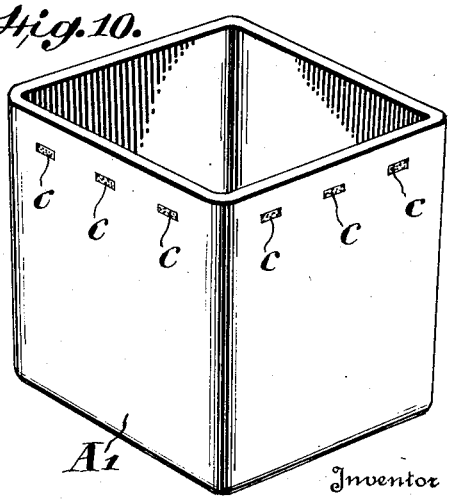
Inventor
John E. Marsden
Lyman D. Oberlin
his Attorney Patented May 16, 1933

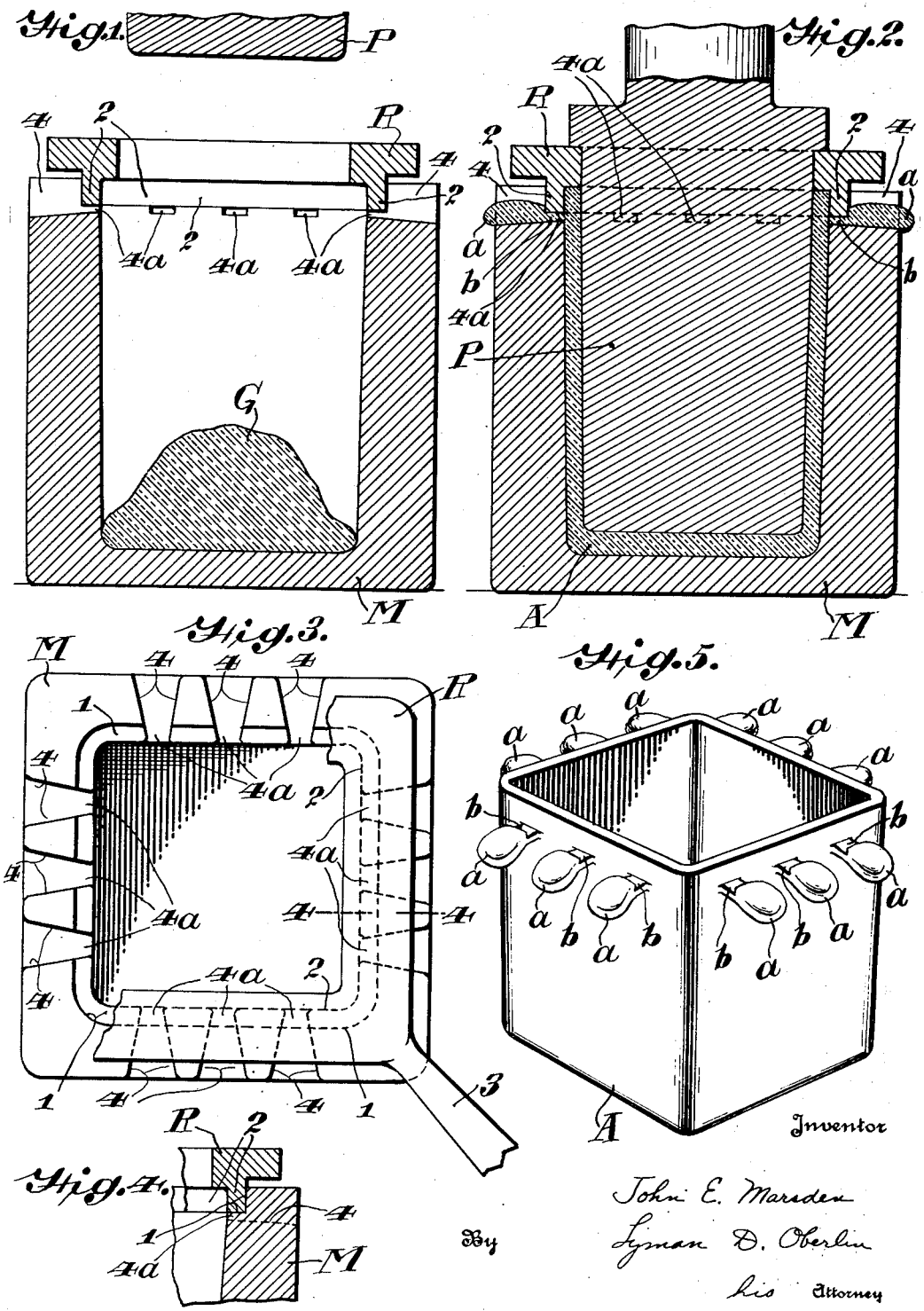

1,909,778

UNITED STATES PATENT OFFICE

JOHN E. MARSDEN, OF CYNWYD, PENNSYLVANIA, ASSIGNOR TO GAYNER GLASS WORKS, OF SALEM, NEW JERSEY, A CORPORATION OF NEW JERSEY

METHOD OF PRODUCING RECEPTACLES FROM MOLTEN MATERIAL

Application filed May 7, 1929. Serial No. 361,048.

My invention relates to receptacles and to a method of and apparatus for producing or forming them from molten material usually molten glass.

My invention, in one of its prominent phases, involves an arrangement for retaining one or more of the vertical walls of a receptacle closely adjacent the respective mold surfaces after withdrawal of the forming plunger and while the material forming said wall or walls remains in its plastic condition.

My invention further resides in a receptacle produced by my apparatus and in accordance with my method.

Further objects, advantages and characteristics of my invention will become apparent from the following detailed description taken in connection with the accompanying drawings.

For an understanding of my methods and for an illustration of some of the various forms my apparatus may take, reference is to be had to the accompanying drawings in which:

Figure 1 is a vertical sectional view of apparatus constructed in accordance with my invention;

Fig. 2 is a vertical sectional view of the apparatus shown in Fig. 1 and with the plunger fully within the mold;

Fig. 3 is a plan view, partly broken away, of the mold and ring structure shown in Fig. 1;

Fig. 4 is a fragmentary vertical sectional view and is taken on the line 4—4 of Fig. 3;

Fig. 5 is a perspective view of a receptacle after removal from the mold;

Fig. 6 is a vertical sectional view of apparatus of a modified form as constructed in accordance with my invention;

Fig. 7 is a fragmentary vertical sectional view of the apparatus shown in Fig. 6 and with the plunger fully within the mold;

Fig. 8 is a plan view, partly broken away, of the mold and ring structure shown in Fig. 6;

Fig. 9 is a fragmentary vertical sectional view and is taken on the line 9—9 of Fig. 8; and Fig. 10 is a perspective view of the completed receptacle.

Referring to Figs. 1, 2, 3, and 4, M represents a mold or container formed of any suitable material, as iron or steel, and of any suitable interior configuration depending upon the type of article or receptacle to be produced. In the example shown, mold M is generally square in horizontal cross section although it shall be understood that the cross-sectional configuration may be otherwise as desired. Coactable with the mold M and movable interiorly thereof is a forming member or plunger P substantially the same in horizontal cross section as the particular mold with which it is to be associated. Carried by the mold M at the top thereof is a ring R, the interior surface of which conforms with the exterior surface of the plunger P; the latter is slidable to and fro through the ring R and the fitting engagement between the two members is snug or close enough to prevent escape of any substantial amount of the material contained by the mold to a region above the ring R.

As illustrated in Figs. 3 and 4, the mold M, on its interior upper surface, may be cut away as indicated at 1 to provide a pocket in which the flanged section 2 of ring R is detachably received. It follows, therefore, that the ring R is securely held in the position illustrated in Figs. 1–4. If desired, the ring R may be provided with an actuating handle 3.

Mold, plunger and ring structure of the character described above are well known to the glass-shaping art. In general, to produce a glass receptacle, the various parts are brought to high temperature and, with the various forming surfaces oiled, or otherwise suitably treated, a gob or mass G of molten glass is disposed within the mold M and the plunger P lowered through the ring R and into the mold M to thereby shape the gob of molten glass. Thereafter, the plunger is elevated and, after removal of the ring R, the shaped article is allowed to cool somewhat and then withdrawn from the mold.

A serious defect of this prior art practice resides in the fact that, during the cooling action last named, the vertical walls of the glass receptacle, while extremely hot, tend to and do buckle somewhat and, therefore, recede from the adjacent mold walls. As a result, the shaped article does not retain the true configuration imposed by the mold M and, when cold, the vertical walls of said receptacle may bow or sag inwardly. This defect has been overcome to some extent, but unsatisfactorily, by utilizing a small shaping plunger which is manually manipulated, interiorly of the receptacle immediately after the plunger P is withdrawn, in an endeavor to retain the receptacle vertical walls in engagement with the adjacent mold walls until sufficient cooling action occurs.

In accordance with my invention, and during the forming or shaping operation, one or more projections or sections is or are formed on one or more of the receptacle vertical walls to positively retain the latter in engagement, or substantially so, with the interior surfaces of the mold vertical walls until the receptacle has cooled sufficiently, with resultant hardening of the glass, to permit it to retain its intended shape or configuration. Ordinarily, said projections or sections extend laterally from the receptacle walls and, preferably, are disposed outwardly of the periphery thereof. These projections or sections cool rather rapidly and the material forming them congeals or hardens and, by coaction with surfaces of the ring or mold, or both, they become substantially immovable and resist or prevent movement of one or more of the receptacle vertical walls from adjacent surfaces of the mold.

Any one of a number of arrangements may be utilized for performing the function described immediately above. Thus, for example, the mold M may be provided with depressions or channels 4 into which some of the molten glass passes during the shaping operation. As illustrated, said depressions 4 are formed in the top surface of the mold and they extend to a depth somewhat below the horizontal mold surface, Figs. 1, 2 and 4, forming the pocket receiving the flange 2 of ring R. In the example shown in Figs. 1-4, the upper portion of the vertical wall structure of the mold is provided with passages or channels 4a of restricted cross-sectional configurations and bounded, in part, by the overlaying flange 2 of ring R.

As illustrated in Figs. 1, 2 and 4, the lower horizontal surface of each of the aforesaid passages 4a and depressions 4 may be inclined downwardly in a direction leading from the mold M, if desired. Moreover, it is desirable that the walls defining the space formed by each passage 4a and depression 4 diverge in a direction leading from the mold recess, Fig. 3.

With the ring R positioned on the mold M as illustrated in Fig. 1 and with a gob G of molten glass of the proper amount in said mold M, the plunger P is suitably and gradually lowered into the position illustrated in Fig. 2 after all of the parts illustrated have been brought to high temperature. After the plunger P engages the gob G of molten glass and thereafter, during lowering movement of said plunger P, the molten glass is brought to receptacle-forming configuration. Due to the close-fitting engagement between the plunger P and ring R, upward passage of molten glass is restricted as illustrated in Fig. 2 but some of said molten glass is forced or passes first through the passages 4a and then into the depressions 4. Thus, as illustrated in Fig. 2, there is formed a receptacle A having integrally formed therewith the sections or bulbs a each, ordinarily, connected to a receptacle vertical wall by a neck or section b.

After the plunger P reaches the limit of its downward movement, it is withdrawn and the shaped receptacle A is left within the mold M. By the time that the plunger P is thus withdrawn from supporting relation with respect to the receptacle vertical walls, the glass necks b and bulbs a, particularly the latter, have cooled accompanied by resultant solidification to some extent at least. The bulbs a, when formed, engage the vertical walls of the depressions 4 and the adjacent surfaces of the flange 2 of ring R. Accordingly, the solid or semi-solid bulbs a are locked in the position illustrated in Fig. 2, for example, and the vertical walls of receptacle A are maintained in their desired position interiorly of the mold M, that is, in engagement, or substantially so, with the adjacent vertical walls of the mold M.

After the plunger P has been removed from the receptacle A, the walls of the latter cool at a reasonably rapid rate and soon the former molten glass becomes solid or substantially so. When this occurs, the ring R may be disengaged from the mold M and the receptacle A with the thereto-secured necks b and bulbs a removed from said mold M and disposed in some region where the cooling action is completed. The receptacle A, in the condition just described, is illustrated in Fig. 5.

Referring to Figs. 6, 7, 8 and 9, there is illustrated another arrangement for permitting passage of the molten glass into position to form the necks b and bulbs a. In this case, the channels through which the molten glass thus passes are formed in the ring R1 and not in the mold M1. As shown, the bottom surface of the flange 5 of said ring R1 is provided with a plurality of spaced passages or channels 6a of restricted cross-sectional configurations and bounded, in part, by the lower horizontal surface of the pocket receiving said flange 5 of ring R1. These passages 6a open, respectively, into depressions or recesses 6 formed at the upper portion of the vertical wall structure of mold M1. As illustrated, the bottom walls of said depressions 6, preferably, incline downwardly in a direction leading from the mold interior and the upper walls of the passages 6a, preferably, incline upwardly in the same direction. Furthermore, as illustrated in Fig. 8, it is desirable that the walls defining the space formed by each channel 6a and depressions 6 diverge in a direction leading from the interior of said mold M1.

The operation of the form of my invention illustrated in Figs. 6-9 is substantially the same as described above in connection with Figs. 1-4. Briefly, the gob G of molten glass is brought to receptacle-forming configuration in response to the entrance of the plunger P into the mold M1 after the various parts have been brought to high temperature. During conclusion of the shaping operation, the necks b and bulbs a are formed by outward passage of some of the molten material through the channels 6a in the ring R1; the necks b and bulbs a cool quicker than the molten material forming the receptacle walls proper and, therefore, function to prevent movement toward each other of said walls after withdrawal of the plunger P. As was the case with the construction shown in Figs. 1-4, the shaped receptacle, after the walls become hard, may be removed from the mold M1, the ring R1 first having been removed.

In either case, there is produced a receptacle A substantially of the character illustrated in Fig. 5. After said receptacle has cooled, the bulbs a and necks b may be removed in any suitable manner to produce the completed receptacle A1 shown in Fig. 10. To thus remove the bulbs a and necks b, or equivalent, a grinding tool may be employed but, preferably, such removal is effected by operation of a suitably controlled chipping tool. In any event, the walls of the completed receptacle A1 are marked, to some extent at least, by surfaces c defining the regions of the various walls to which the necks b were connected.

Although the bulbs a as herein shown are somewhat symmetrical in form, it shall be understood, in actual practice, that their shape may depart rather widely from that illustrated. Thus, said bulbs a may and often do closely resemble the configuration of the necks b alone although, usually of somewhat greater thickness.

Although the bulbs a and necks b are illustrated as formed on all of the walls of the receptacle A, it shall be understood that my invention is not to be so limited. Thus, for example, said bulbs a and necks b may be formed on one or more of the receptacle walls, as desired, although, usually, it is desirable that they be formed on opposite walls at least.

It shall be distinctly understood that a single lateral projection, usually enlarged at its end, may be formed on a single receptacle wall in lieu of a plurality of the bulbs a and necks b. This may readily be accomplished by providing but a single passage in either the ring, mold, or both, for the reception of molten material flowing laterally from one side of the receptacle. Further, when a plurality of said bulbs and necks are formed, the number may be greater or less than the number illustrated. Ordinarily, when a single section is formed laterally of a receptacle wall, the width thereof should be substantial, for example, of the order of the combined widths of a plurality of the necks b.

As illustrated on the drawings, the various passages receiving the molten material to form lateral projections, as a bulb a and a neck b, are divergent in a direction leading from the interior of the respective molds. This construction is desirable although not essential. However, when utilized, said divergent walls form tapered passages receiving the various lateral projections which, by virtue of the taper, more effectually prevent inward movement of said lateral projections and the respective walls to which they are connected.

Receptacles having any desired number of sides and of any suitable configuration may be constructed in accordance with my invention. The side walls need not be plane since, as well, they may be curved or comprise angularly related sections.

Usually, in accordance with my invention, the gobs G of molten glass are measured by the eye, at least. Moreover, the plunger, for each operation, is usually brought to the same distance from the mold bottom wall to thereby produce, for a given lot, receptacles having bottom walls of uniform thickness.

It shall be understood that my invention contemplates broadly, on one or more of the walls of a receptacle, the provision of one or more flanges, lateral projections or necks extending outwardly from each wall and of substantial thickness, as of the order of one-quarter of an inch, more or less, said flanges, projections or necks cooling quicker than the receptacle vertical walls and coacting with adjacent surfaces of the mold or ring, or both, to retain said receptacle walls closely adjacent the vertical walls of the mold. Moreover, it shall be understood that the passages receiving the material forming the aforesaid flanges, projections or necks may be formed in the mold, in the ring, or in adjacent surfaces of both.

What I claim is:

1. The method of forming a receptacle from molten material disposed in a mold, which comprises passing a plunger into said mold to bring said molten material to receptacle-forming configuration, withdrawing said plunger from said mold while said material remains plastic, and thereafter and while the receptacle walls remain plastic preventing substantial movement thereof laterally from the respective adjacent mold walls by the restraining action of material formed integrally with said receptacle walls and cooling quicker than the material forming said receptacle proper.

2. The method of forming a receptacle from molten material disposed in a mold, which comprises passing a plunger a predetermined distance into said mold to produce a receptacle having walls of predetermined thickness, withdrawing said plunger from said mold while said material remains plastic, and preventing substantial displacement of a wall of said receptacle by the restraining action of material formed integrally therewith and cooling quicker than the material forming said receptacle proper.

3. The method of forming a receptacle from molten material disposed in a mold, which comprises passing a plunger into said mold to produce a receptacle having opposite walls disposed substantially in parallel relation, withdrawing said plunger from said mold while said material remains plastic, and thereafter while the receptacle walls remain plastic preventing substantial movement of said parallel walls toward each other by the restraining action of material formed integrally with said receptacle walls and cooling quicker than the material forming said receptacle proper.

In testimony whereof I have signed this specification this 10th day of April 1929.

JOHN E. MARSDEN.